US012332798B2

(12) United States Patent
He et al.

(10) Patent No.: US 12,332,798 B2
(45) Date of Patent: Jun. 17, 2025

(54) INTELLIGENCE PROCESSOR DEVICE AND METHOD FOR REDUCING MEMORY BANDWIDTH

(71) Applicant: SigmaStar Technology Ltd., Fujian (CN)

(72) Inventors: Hu He, Fujian (CN); Shi-Jie Zhou, Fujian (CN)

(73) Assignee: SIGMASTAR TECHNOLOGY LTD., Fujian (CN)

( * ) Notice: Subject to any disclaimer, the term of this patent is extended or adjusted under 35 U.S.C. 154(b) by 419 days.

(21) Appl. No.: 17/968,941

(22) Filed: Oct. 19, 2022

(65) Prior Publication Data

US 2023/0168809 A1 Jun. 1, 2023

(30) Foreign Application Priority Data

Nov. 29, 2021 (CN) .......................... 202111433001.1

(51) Int. Cl.
| | |
|---|---|
| *G06F 12/08* | (2016.01) |
| *G06F 12/0862* | (2016.01) |
| *G06N 3/04* | (2023.01) |
| *G06N 3/0464* | (2023.01) |
| *G06F 3/06* | (2006.01) |

(52) U.S. Cl.
CPC .......... *G06F 12/0862* (2013.01); *G06F 12/08* (2013.01); *G06N 3/0464* (2023.01); *G06F 3/0673* (2013.01)

(58) Field of Classification Search
CPC .... G06N 3/0464; G06N 3/04; G06F 12/0862; G06F 12/12
See application file for complete search history.

(56) References Cited

U.S. PATENT DOCUMENTS

| | | | | |
|---|---|---|---|---|
| 2016/0350645 A1* | 12/2016 | Brothers | .................. | G06N 3/08 |
| 2020/0242456 A1* | 7/2020 | Kang | .................. | G06F 9/30145 |
| 2021/0224191 A1* | 7/2021 | Wang | .................. | G06F 12/0813 |
| 2021/0263849 A1* | 8/2021 | Zheng | ................. | G06F 9/30134 |

(Continued)

OTHER PUBLICATIONS

NPL Alwani Fused Layer CNN Accelerators 2016.*

(Continued)

*Primary Examiner* — Paul M Knight
(74) *Attorney, Agent, or Firm* — Edell, Shapiro & Finnan, LLC

(57) ABSTRACT

An intelligent processing device includes a first memory, a second memory, a memory management circuit and a convolution operation circuit. The memory management circuit transfers an input data from an external memory to the first memory. The convolution operation circuit reads the input data from the first memory, and performs multiple stages of calculations to generate multiple sets of feature map data. After a first data tile of a first feature map data is generated, the memory management circuit stores the first data tile to the second memory. When a data amount of the first data tile stored satisfies a predetermined value, the memory management circuit transfers the first data tile from the second memory to the first memory, and the convolution operation circuit reads the first data tile from the first memory and accordingly performs a second-stage calculation to generate a second data tile of a second feature map data.

6 Claims, 8 Drawing Sheets

(56) References Cited

U.S. PATENT DOCUMENTS

2021/0295138 A1* 9/2021 Symes ............... G06N 3/04
2022/0138586 A1* 5/2022 Kim ................. G06N 3/063

OTHER PUBLICATIONS

NPL Chen DianNao A Small Footprint High Throughput Accelerator 2014.*
NPL Eckert Neural Cache BitSerial InCache Acceleration of DNNs 2018.*
NPL Gondimalla Occam Optimal Data Reuse for CNNs Jun. 2021.*
NPL Huang Efficient loop tilling framework CNN accelerators Jun. 2021.*
NPL Jin Split CNN Splitting Window based Operations in CNNs 2019.*
NPL Jokic Improving Memory Utilization in CNN Accelerators 2020.*
NPL Kim PCM Precision Controlled Mem Energy Eff DNN Training 2020.*
NPL Lee CNN Accelerator for Power Efficient Real Time Vision Processing 2019.*
NPL Lockerman Livia Data Centric Computing 2020.*
NPL Mittal Survey of Prefetching Techniques Processor Caches 2016.*
NPL Peled A NN Prefetcher for Arbitrary Memory Access Patterns 2019.*
NPL Shafiee ISAAC A CNN Accelerator with Tiles 2016.*
NPL Shahshahani Framework for Mapping CNNs on FPGAs Aug. 2021.*
NPL Siu Memory Requirements for CNN Hardware Accelerators 2018.*
NPL Stoutchinin Scheduling CNN Convolutions for Efficient Memory Access 2019.*
NPL Wang Efficient Hardware Architectures for DCNNs 2018.*

* cited by examiner

US 12,332,798 B2

INTELLIGENCE PROCESSOR DEVICE AND METHOD FOR REDUCING MEMORY BANDWIDTH

This application claims the benefit of China application Serial No. CN2021 11433001.1, filed on Nov. 29, 2021, the subject matter of which is incorporated herein by reference.

BACKGROUND OF THE INVENTION

Field of the Invention

The present application relates to intelligent processors, and more particularly, to an intelligent processing device and a method for reducing a memory bandwidth.

Description of the Related Art

A current neural network model usually includes multiple layers of a convolution operation that are sequentially performed. As shown in FIG. 1, in the prior art, an input feature map in a dynamic random access memory (DRAM) are split into multiple data tiles (depicted by dotted lines). In the first-layer convolution operation, the processor sequentially acquires and processes the multiple data tiles to generate new multiple data tiles, and sequentially writes the new multiple data tiles back to the DRAM. Next, when the second-layer convolution operation is performed, the processor sequentially reads and processes the new data tiles acquired by the first-layer convolution operation from the DRAM to generate new multiple data tiles and sequentially writes the new multiple data tiles back to the DRAM. The process is similarly performed until all layers of the convolution operation are complete. In other words, in the prior art, the data output by each layer of the convolution operation is used as an input data of the next layer, and thus the DRAM needs to be repeatedly read and written. As a result, in the prior art, the DRAM needs to have a larger memory bandwidth in order to perform the convolution operation with multiple layers.

SUMMARY OF THE INVENTION

In some embodiments, an intelligent processing device includes a first memory, a memory management circuit, a second memory and a convolution operation circuit. The memory management circuit reads an input data from a dynamic random access memory (DRAM), and stores the input data to the first memory. The convolution operation circuit reads the input data from the first memory, and performs multiple stages of calculations corresponding to a convolution operation on the input data to generate multiple sets of output feature map. After the convolution operation circuit performs a first-stage calculation among the multiple stages of calculations to generate at least one set of first data tile of a first set of output feature map among the multiple sets of output feature map, the memory management circuit stores the at least one set of first data tile to the second memory. When a data amount of the at least one set of first data tile stored in the second memory satisfies a predetermined value, the memory management circuit transfers the at least one set of first data tile from the second memory to the first memory, and the convolution operation circuit reads the at least one set of first data tile from the first memory, accordingly performs a second-stage calculation among the multiple stages of calculations on the at least one set of first data tile to generate at least one set of second data tile of a second set of output feature map among the multiple sets of output feature map, and stores the at least one set of second data tile to the second memory through the memory management circuit.

In some embodiments, the method for reducing a memory bandwidth is applicable to an intelligent processing device that executes a convolutional neural network (CNN) model. The intelligent processing device includes a first memory, a memory management circuit, a second memory and a convolution operation circuit. The method for reducing a memory bandwidth includes: determining, according to a capacity of the first memory, a data size of a data tile stored in the first memory when the convolution operation circuit performs a convolution operation, wherein the memory management circuit transfers the data tile from a dynamic random access memory (DRAM) to the first memory, and the convolution operation circuit sequentially performs multiple stages of calculations corresponding to the convolution operation on the data tile to generate multiple sets of output feature map; determining, according to a capacity of the second memory and a data amount of a first-part data of a last set of output feature map among the multiple sets of output feature map, the number of stages of the calculations and a data amount needed for generating at least one second-part data in each of the remaining data of the multiple sets of output feature map; and generating a precompiled file according to the data size of the data tile, the number of stages of calculations, the data amount of the first-part data and the data amount of the at least one second-part data, wherein the memory management circuit accesses the DRAM, the first memory and the second memory based on the precompiled file.

Features, implementations and effects of the application are described in detail in preferred embodiments with the accompanying drawings below.

BRIEF DESCRIPTION OF THE DRAWINGS

To better describe the technical solution of the embodiments of the present application, drawings involved in the description of the embodiments are introduced below. It is apparent that, the drawings in the description below represent merely some embodiments of the present application, and other drawings apart from these drawings may also be obtained by a person skilled in the art without involving inventive skills.

DETAILED DESCRIPTION OF THE INVENTION

All terms used in the literature have commonly recognized meanings. Definitions of the terms in commonly used dictionaries and examples discussed in the disclosure of the present application are merely exemplary, and are not to be construed as limitations to the scope and meanings of the present application. Similarly, the present application is not limited to the embodiments enumerated in the description of the application.

The term "coupled" or "connected" used in the literature refers to two or multiple elements being directly and physically or electrically in contact with each other, or indirectly and physically or electrically in contact with each other, and may also refer to two or more elements operating or acting with each other. As given in the literature, the term "circuit" may be a device connected by at least one transistor and/or at least one active element by a predetermined means so as to process signals.

In some embodiments, an intelligent processing device (for example, an intelligent processing device 230 in FIG. 2) can split multiple layers of a convolution operation in a convolutional neural network (CNN) model into multiple stages of calculations, temporarily store calculation results generated in the multiple stages of calculations in a cache (for example, a memory 233 in FIG. 2), and write final generated data back to a dynamic random access memory (DRAM) (for example, a memory 220 in FIG. 2) after the calculations of all the stages are completed. Thus, the bandwidth requirement of the DRAM can be reduced.

Figure 2:
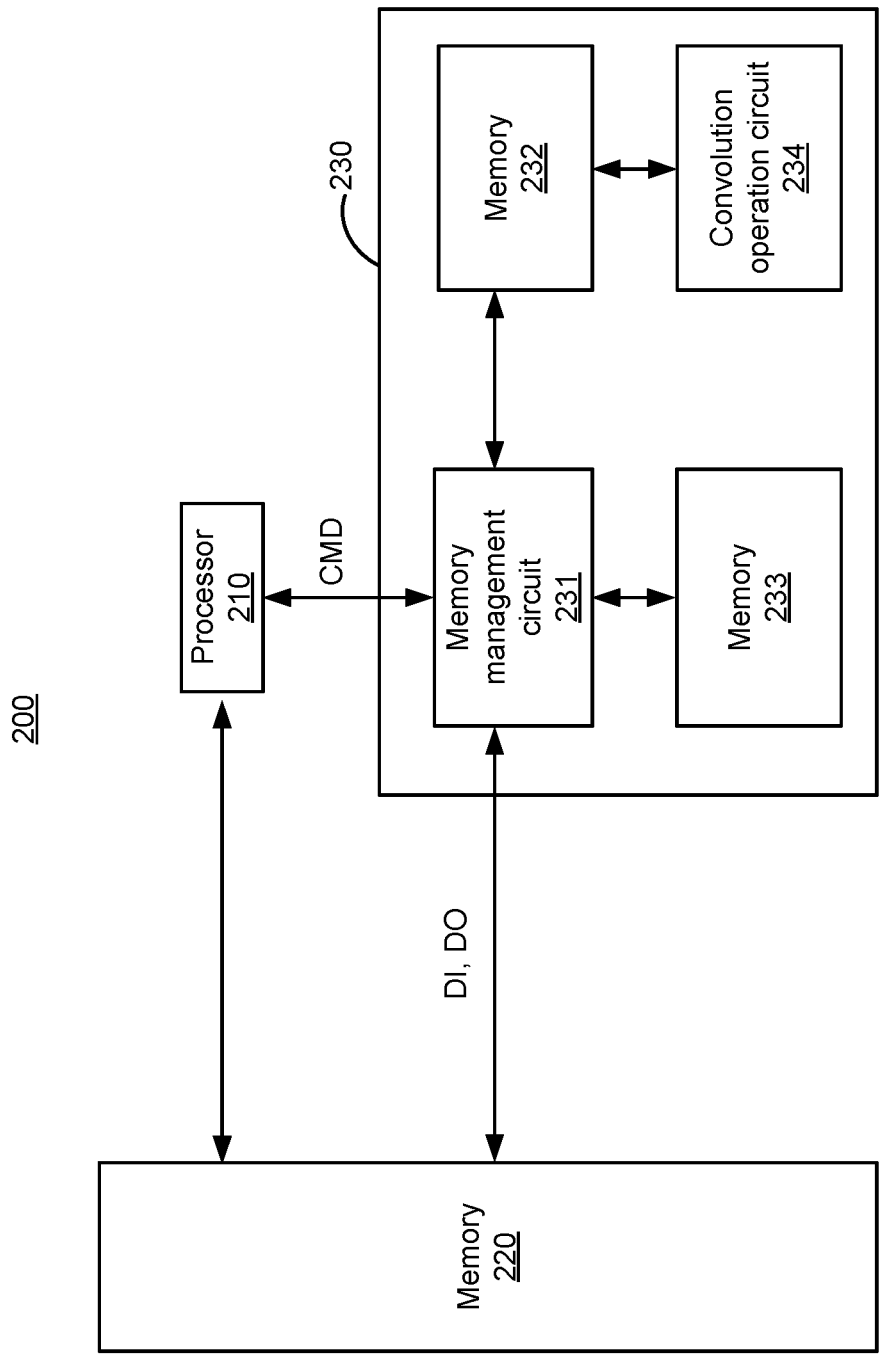
FIG. 2 is a schematic diagram of an artificial intelligence (AI) system according to some embodiments of the present application.

FIG. 2 shows a schematic diagram of an artificial intelligence (AI) system 200 according to some embodiments of the present application. The AI system 200 includes a processor 210, a memory 210 and an intelligent processing (or intelligent processing unit) device 230. The AI system 200 can execute a neural network model (for example but not limited to, a CNN model) so as to process various types of data (for example but not limited to, image data).

The memory 200 can store an input data DI to be processed and an output data DO processed by the intelligent processing device 230. In some embodiments, the memory 220 may be a DRAM. The intelligent processing device 230 can read the input data DI from the memory 220 based a control of the processor 210, and perform a convolution operation on the input data DI to generate the output data DO.

More specifically, the intelligent processing device 230 includes a memory management circuit 231, a memory 232, a memory 233 and a convolution operation circuit 234. The memory management circuit 231 is coupled to the memory 232, the memory 233 and the memory 220. In some embodiments, the memory management circuit 231 may be implemented by a circuit such as, for example but not limited to, a memory management unit and a direct memory access (DMA) controller. The memory management circuit 231 can read the input data DI from the memory 220 to the memory 232 based on a control of the processor 210 and/or the convolution operation circuit 234. The convolution operation circuit 234 can access the memory 232 so as to obtain the input data DI, and perform a convolution operation on the input data DI to generate the output data DO. After the convolution operation circuit 234 generates the output data DO, the memory management circuit 231 can send the output data DO to the memory 220 so as to store the output data DO.

In some embodiments, the processor 210 can send a command CMD based on a precompiled file (not shown) to the intelligent processing device 230, and the intelligent processing device 230 can read the input data DI from the memory 220 in response to the command CMD and perform the convolution operation on the input data DI to generate the output data DO. The intelligent processing device 230 can further split multiple layers of the convolution operation of the CNN model into multiple stages of calculations in response to the command CMD. The memory management circuit 231 can temporarily store an output result (for example, an output feature map to be described later) generated from each stage of calculations by the convolution operation circuit 234 to the memory 233, and the convolution operation circuit 234 can access the memory 233 through the memory management circuit 231 during the calculations so as to use the temporarily stored data to complete the calculation of each stage, and write a calculation result of the last stage (equivalent to the output data DO) back to the memory 220 after the calculations are completed. Thus, the number of times of access to the memory 220 by the intelligent processing device 230 is reduced, the memory bandwidth needed in the AI system 200 is accordingly reduced. Operation details related to the process above are described with reference to FIG. 3A to FIG. 3C below.

In some embodiments, the memory 232 and the memory 233 are both static random access memories (SRAMs), for example, the memory 232 may be a level-2 (L2) cache, and the memory 233 may be a level-3 (L3) cache. In some embodiments, the memory 232 is a two-dimensional memory, and a data width of the memory 232 is equal to a data width of the convolution operation circuit 234 and/or that of the memory management circuit 231. For example, the memory 232 may have 32 channels, each of which has a data width of 256 bits and a depth of 512; however, the present application is not limited to the examples above. The memory 232 is directly connected to the convolution operation circuit 234, so as to facilitate direct access of the convolution operation circuit 234. In contrast, the memory 233 is a one-dimensional memory, and has a data width different from the data width of the convolution operation circuit 234 and/or the data width of the memory management circuit 231, and the convolution operation circuit 232 can access the memory 233 through the memory management circuit 231 so as to temporarily store the result generated by each stage of calculations.

To illustrate operations related to the intelligent processing device 230, some terms of the convolution operation as well as multi-stage calculations and a data transfer process of the intelligent processing device 230 are sequentially described below.

Figure 3A:
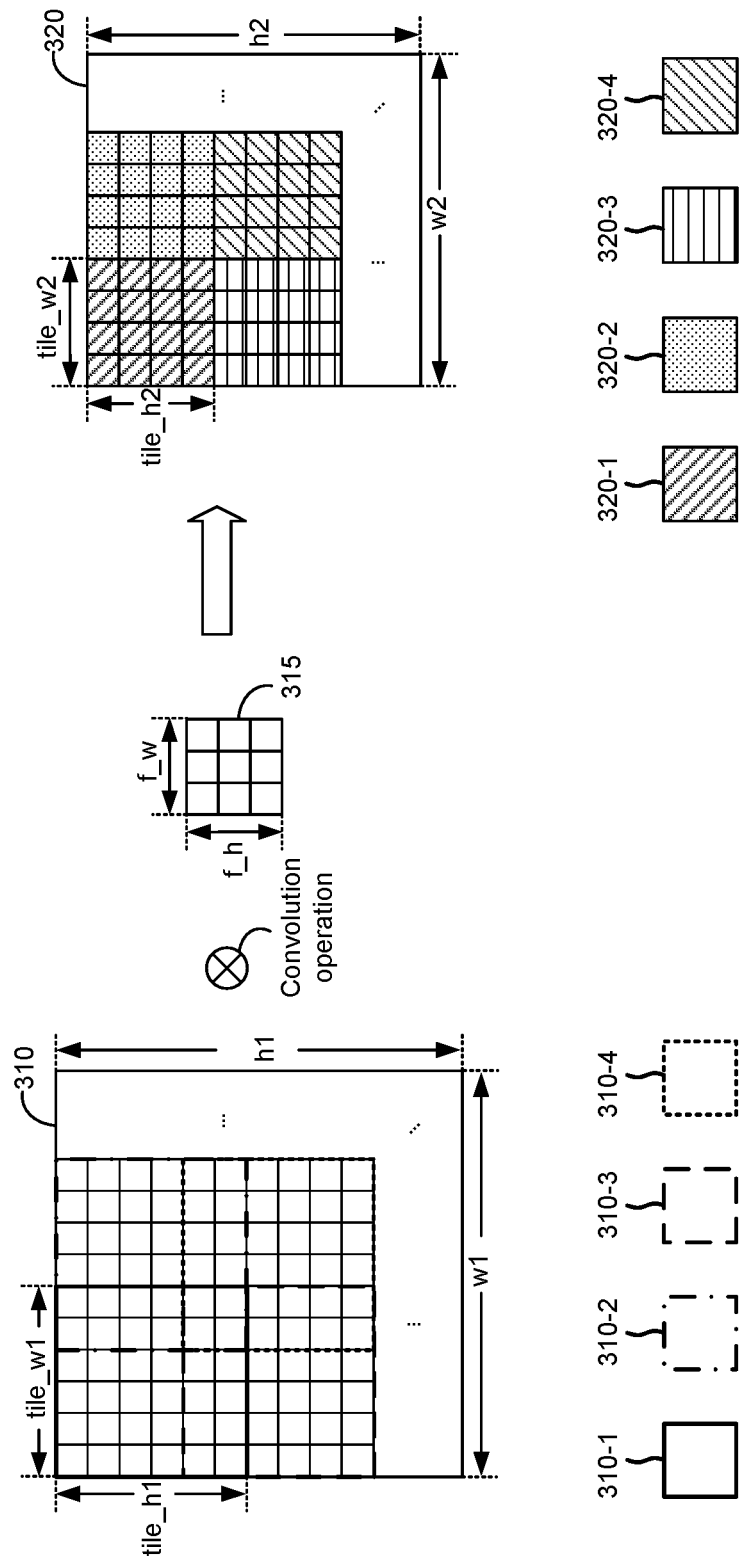
FIG. 3A is a schematic diagram of fundamental concepts of a convolution operation according to some embodiments of the present application.

FIG. 3A shows a schematic diagram of fundamental concepts of a convolution operation according to some embodiments of the present application. As shown in FIG. 3A, an input feature map 310 has a width w1 and a height h1, and an output feature map 320 has a width w2 and a height h2. In this example, the input feature map 310 includes four data tiles 310[1] to 310[4] (represented by blocks in different line patterns), and the output feature map 320 includes four data tiles 320[1] to 320[4] (represented by different shading patterns). Each of the data tiles 310[1] to 310[4] has a width tile_w1 and a height tile_h1, and each of the data tiles 320[1] to 320[4] has a width tile_w2 and a height tile_h2. During the process of performing the convolution operation, the memory management circuit 231 can transfer one of the data tiles of the input feature map 310 to the memory 232, and the convolution operation circuit 234 can read the data tile from the memory 232 and use a convolution kernel 315 to perform an operation on the data tile so as to generate one corresponding data tile of the output feature map 320. For example, the memory management circuit 231 can transfer the data tile 310[1] to the memory 232, and the convolution operation circuit 234 can read the data tile 310[1] from the memory 232 and use the convolution kernel 315 to perform an operation on the data tile 310[1] so as to generate the data tile 320[1].

In some embodiments, the convolution operation circuit 234 can split convolution operations of multiple layers into multiple stages of calculations, and the operation means of each stage of calculations is similar to the operation concept shown in FIG. 3A. The output feature map generated by the calculation of a current stage is used as the input feature map of the calculation of a next stage, and the output feature map of the calculation of the next stage is further used as the input feature map of the calculation of a second next stage. However, in an actual operation, for the same data tile, a data size of data tile of output feature map of a previous stage is usually different from a data size of tile data of input feature map data of a next stage. For example, as shown in FIG. 3A, the data size (for example, the width tile_w1 and the height tile_h1) of the data tile (for example, the data tile 310[1]) in the input feature map 310 is greater than the data size (for example, the width tile_w2 and the height tile_h2) of the data tile (for example, the data tile 320[1]) in the output feature map 320. Hence, a data amount of the data tile of output feature map of a previous stage needs to be sufficiently enough in order to serve as at least one data tile of input feature map for a next stage of calculation. With the memory 233 provided, once one calculation in each stage of calculations is completed, the convolution operation circuit 234 can transfer a corresponding data tile output from the output feature map of a current stage to the memory 233 through the memory management circuit 231. Once an amount of multiple data tiles stored in the memory 233 adds up to be sufficiently enough, the convolution operation circuit 234 can access the memory 233 through the memory management circuit 231 to acquire the multiple data tiles and use the multiple data tiles as at least one data tile of the input feature map for a next stage, so as to perform the convolution operation of the next stage and to generate at least one data tile of the output feature map of the next stage.

Figure 1:
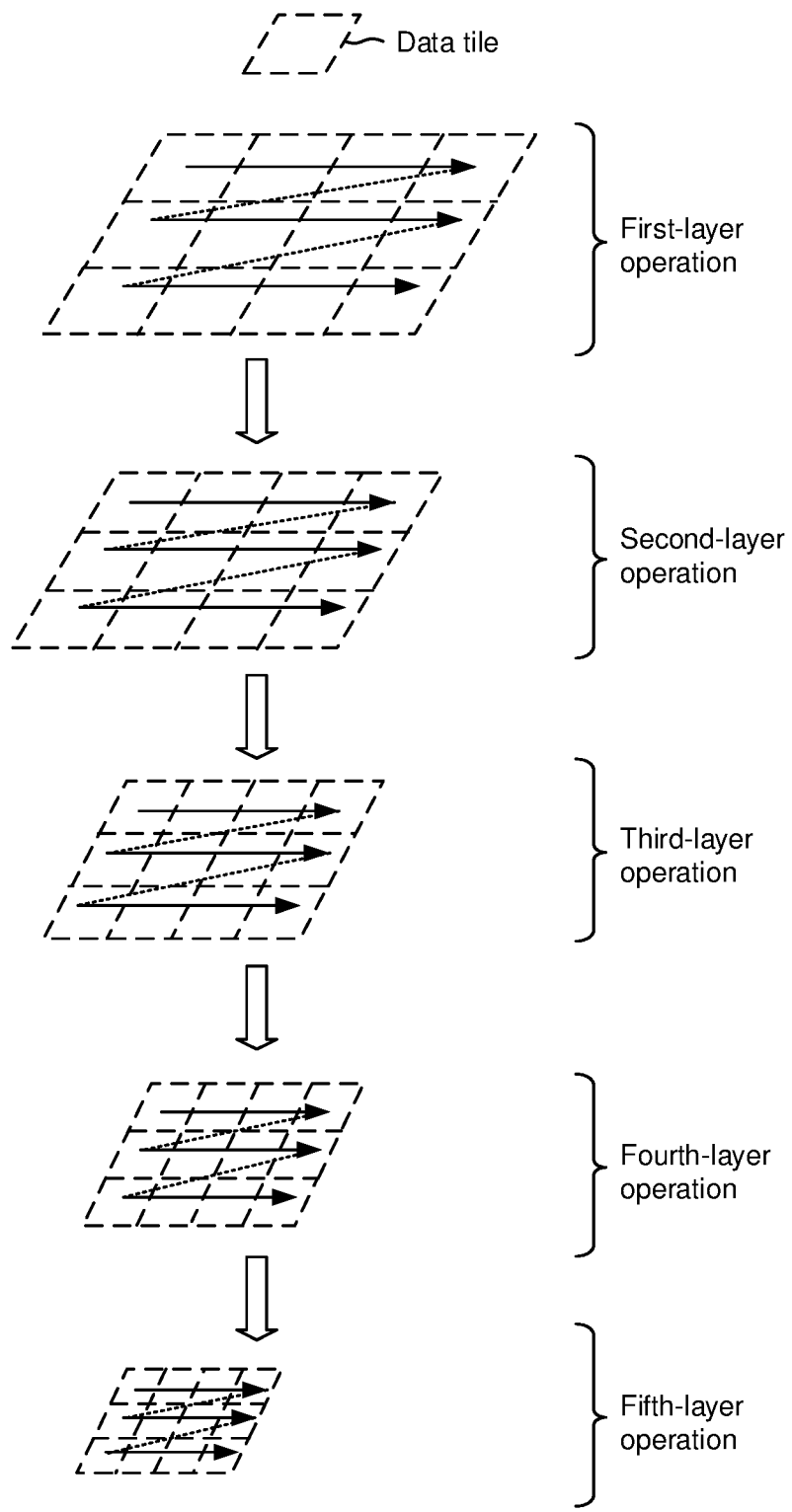
FIG. 1 is a conceptual and schematic diagram of a convolution operation performed according to the prior art.
Figure 3B:
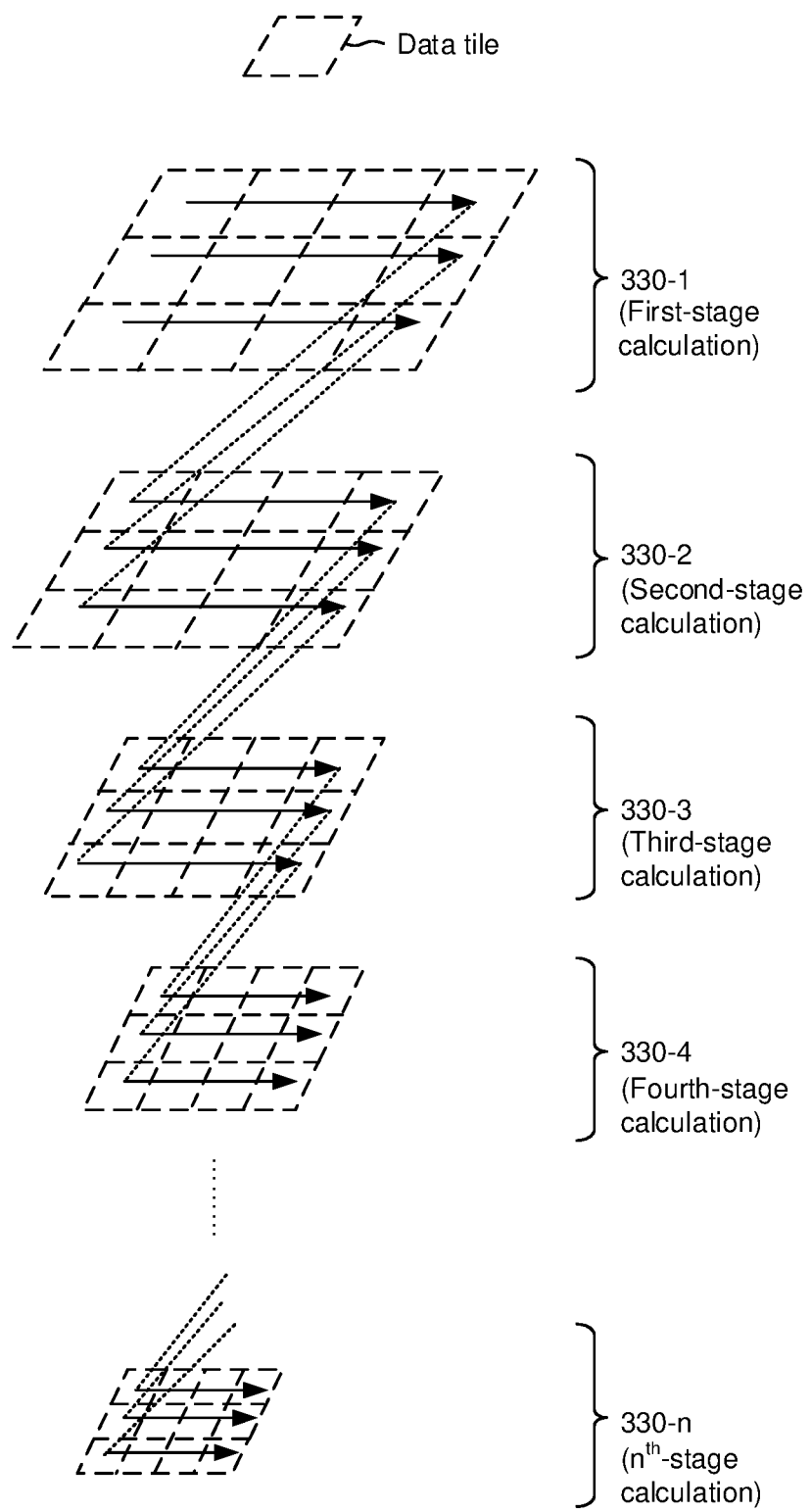
FIG. 3B is a conceptual and schematic diagram of a convolution operation performed by the intelligent processing device in FIG. 2 according to some embodiments of the present application.

FIG. 3B shows a conceptual and schematic diagram of a convolution operation performed by the intelligent processing device 230 in FIG. 2 according to some embodiments of the present application. As shown in FIG. 1, in the prior art, an operation result generated by each layer of the convolution operation is first written back to the DRAM and read from the DRAM for a calculation of a next row data or a next convolution layer. As a result, the DRAM needs to have a read/write bandwidth that is sufficiently large. Compared to the prior art, in some embodiments of the present invention, the convolution operation circuit 234 can split the convolution operations of multiple layers into multiple stages of calculations, only a part of the convolution operation of one layer is completed in each stage of calculations, the calculation results of the stages are stored temporarily one after another in the memory 233 (instead of being directly stored back to the memory 220), and the calculation result of a previous stage is read for the calculation from the memory 233 when the calculation of the next stage is performed. After the calculations of all the stages are similarly performed, the convolution operation circuit 234 can generate the output data DO, and store the output data DO through the memory management circuit 231 to the memory 220. Thus, the utilization bandwidth of the memory 220 can be reduced.

In FIG. 3B, the data tiles of the output feature maps corresponding to the calculations of various stages are drawn in dotted grids. The convolution operation circuit 234 performs a first stage calculation on the input data DI to generate output feature map 330-1 corresponding to the first stage. The memory management circuit 231 sequentially temporarily stores multiple data tiles of the output feature map 330-1 to the memory 233. Once the amount of the multiple data tiles of the output feature map 330-1 stored in the memory 233 satisfies a predetermined value (for example but not limited to, accumulated up to data tiles of one row), the convolution operation circuit 234 reads these data tiles from the memory 233 through the memory management circuit 231, uses these data tiles (corresponding to the output feature map 330-1) as at least one data tile of the input feature map of a second stage calculation, and performs the second-stage calculation on the data tile to generate data tile of the output feature map 330-2 corresponding to the second stage. The above predetermined value is a data amount that is sufficient for the convolution operation circuit 234 to generate at least one data tile (for example but not limited to, data tiles of one row) in the output feature map 330-2. Similarly, the convolution operation circuit 234 can sequentially perform multiple stages of operations, and sequentially generate multiple data tiles of output feature map 330-3, 330-4, . . . and 330-n, wherein the output feature map 330-n of the last-stage calculation is equivalent to the output data DO corresponding to the input data DI having undergone processing of n convolution layers.

Figure 3C:
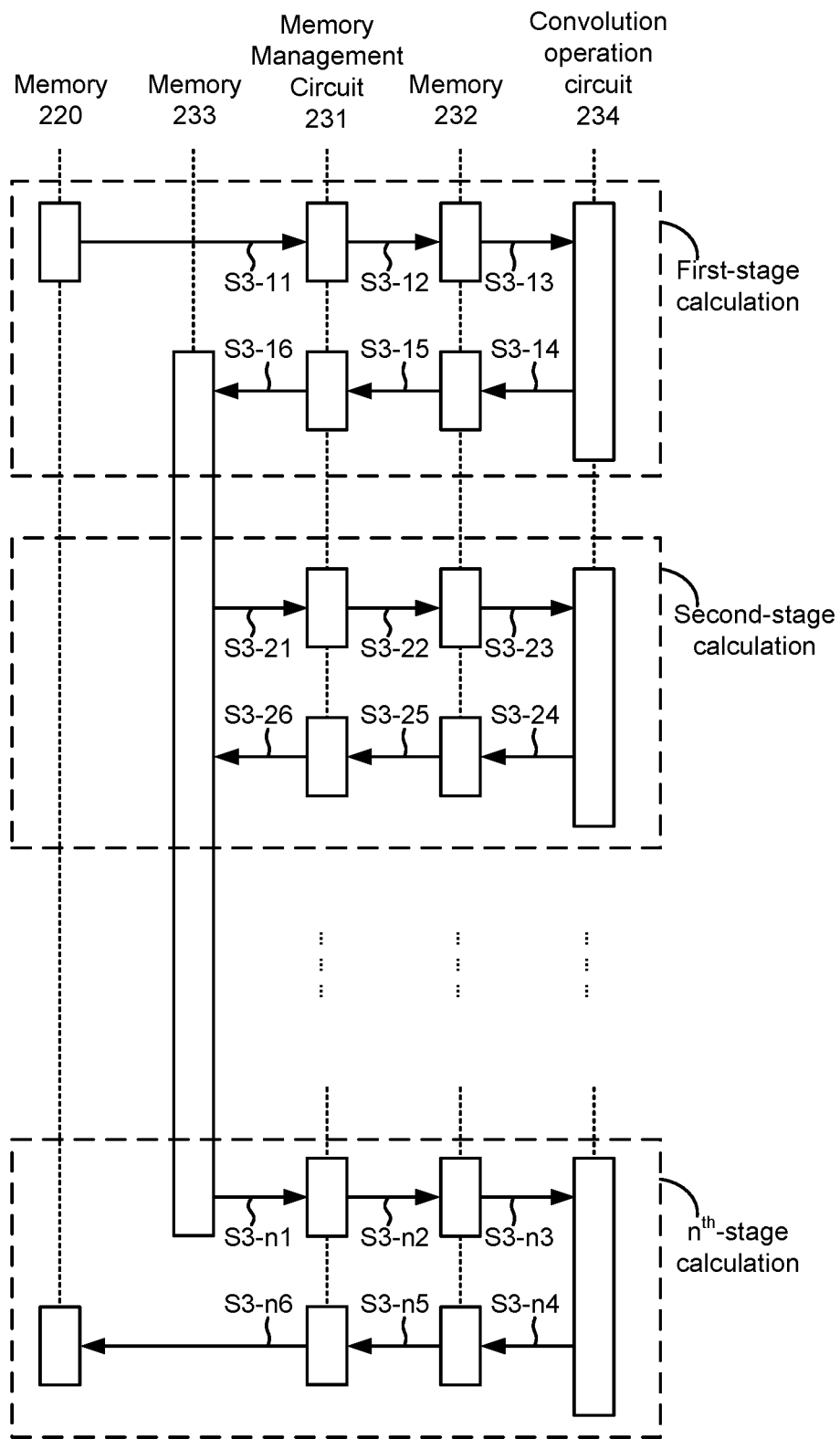
FIG. 3C is a schematic diagram of a data transfer process of the intelligent processing device in FIG. 2 according to some embodiments of the present application.

FIG. 3C shows a schematic diagram of a data transfer process of the intelligent processing device 230 in FIG. 2 according to some embodiments of the present application. In this example, the multi-layer convolution operation shown in FIG. 3B can be further split into n stages of calculations. In the first-stage calculation, the memory management circuit 231 can read at least one data tile (step S3-11) in the input data DI (the input feature map of the first-stage calculation) from the memory 220, and store the at least one data tile to the memory 232 (step SS-12). The convolution operation circuit 234 can acquire the at least one data tile from the memory 232, and perform a convolution operation on the at least one data tile to generate at least one data tile of the output feature map 330-1 (step S3-13). The convolution operation circuit 234 can store the at least one data tile of the output feature map 330-1 to the memory 232 (step S3-14). The memory management circuit 231 can transfer the at least one data tile of the output feature map 330-1 stored in the memory 232 to the memory 233 (step S3-15 and step S3-16). Step S3-11 to step S3-16 are repeated until the data amount of the at least one set of data tile of the output feature map 330-1 stored in the memory 233 satisfies a first predetermined value, and the memory management circuit 231 can read the at least one data tile (namely at least one data tile of the output feature map of the first-stage calculation) from the memory 233 to proceed to the second-stage calculation (step S3-21) and transfer the at least one data tile of the output feature map 330-1 (equivalent to at least one data tile of the input feature map of the second-stage calculation) to the memory 232 (step S3-22). The first predetermined value above is a data amount that is sufficient for the convolution operation circuit 234 to generate at least one data tile (for example but not limited to, data tiles of one row) of the output feature map 330-2. In one embodiment, the memory management circuit 231 can read one or more data tiles satisfied the first predetermined value from the memory to proceed the second-stage the convolution.

Similarly, in the second-stage calculation, the convolution operation circuit 234 can acquire the at least one data tile (namely the at least one data tile of the output feature map 330-1) from the memory 232, and perform a calculation on the at least one data tile to generate at least one data tile of the output feature map 330-2 (step S3-23). The convolution operation circuit 234 can store the at least one data tile of the output feature map 330-2 to the memory 232 (step S3-24), and the memory management circuit 231 can transfer the at least one data tile of the output feature map 330-2 stored in the memory 232 to the memory 233 (step S3-25 and step S3-26). Step S3-21 to step S3-26 are repeated until the data amount of the at least one data tile of the output feature map 330-2 stored in the memory 233 satisfies a second predetermined value, and the memory management circuit 231 can read the at least one data tile from the memory 233 to proceed to the third-stage calculation (not shown), wherein the second predetermined value is a data amount that is sufficient for the convolution operation circuit 234 to generate at least one data tile of the output feature map 330-3.

Similarly, once the data amount of the at least one data tile of the output feature map 330-($n$-1) stored in the memory 233 satisfies a specific predetermined value, the memory management circuit 231 can read the at least one data tile from the memory 223 to proceed to the $n^{th}$-stage calculation (step S3-$n$1), and store the at least one data tile of the output feature map 330-($n$-1) (equivalent to the input feature map of the $n^{th}$-stage calculation) to the memory 232 (step S3-$n$2), wherein the specific predetermined value is a data amount that is sufficient for the convolution operation circuit 234 to generate at least one data tile of the output feature map 330-$n$. In the $n^{th}$-stage calculation, the convolution operation circuit 234 can acquire the at least one data tile from the memory 232, and perform a convolution operation on the at least one data tile to generate at least one data tile of the output feature map 330-$n$ (step S3-$n$3). The convolution operation circuit 234 can store the at least one data tile of the output feature map 330-$n$ to the memory 232 (step S3-$n$4), and the memory management circuit 231 can transfer the at least one data tile of the output feature map 330-$n$ stored in the memory 232 to the memory 220 (step S3-$n$5 and step S3-$n$6).

In other words, during the first-stage calculation, the data tile of the input feature map is read from the memory 220. All the data tile of the input (or output) feature map data generated during the calculations of the middle stages are stored to the memory 233. When the last-stage (that is, n-stage) calculation is performed, the final output feature map 330-$n$ (equivalent to the output data DO) is stored to the memory 220. By repeating the above steps, the convolution operation circuit 234 can complete the calculations on all the data tile temporarily stored in the memory 233.

Figure 4:
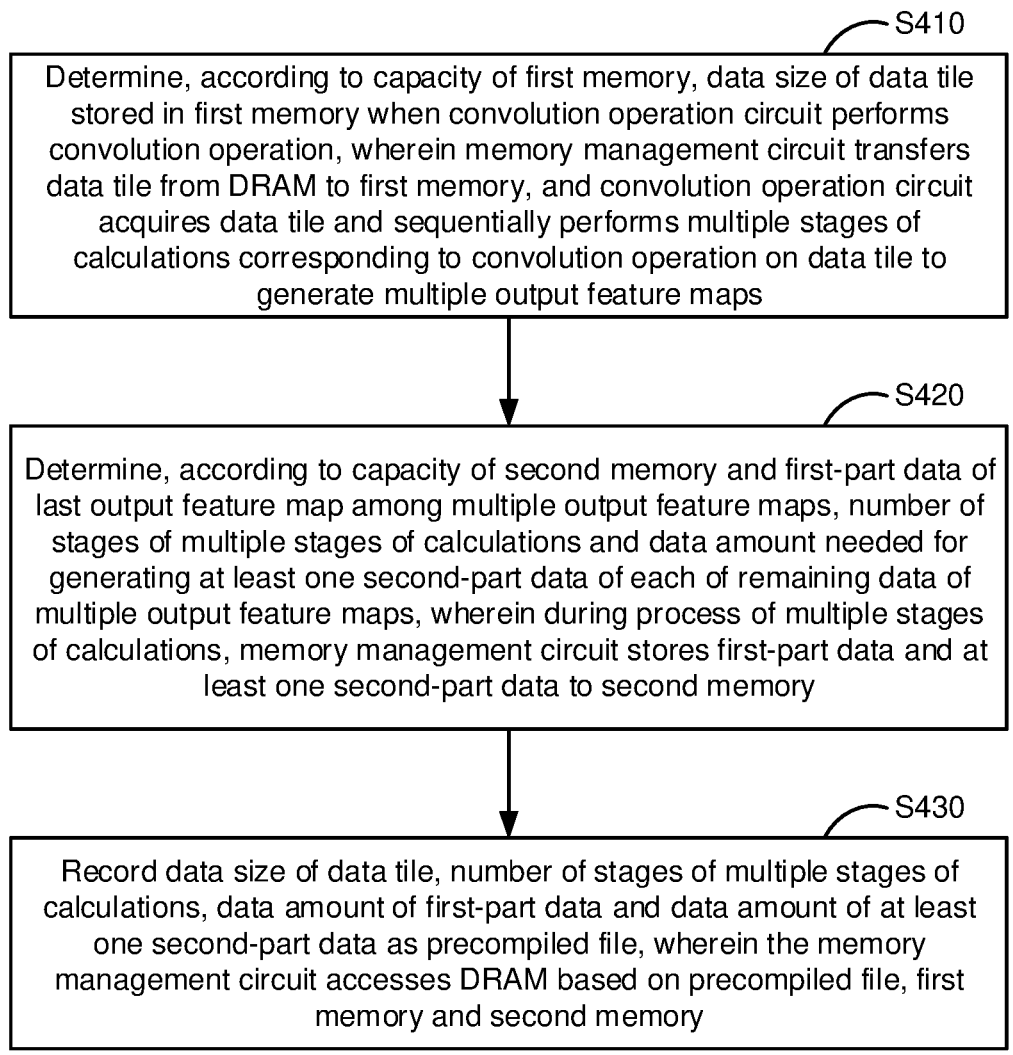
FIG. 4 is a flowchart of a method for reducing a memory bandwidth according to some embodiments of the present application.

FIG. 4 shows a flowchart of a method 400 for reducing a memory bandwidth according to some embodiments of the present application. The method 400 for reducing a memory bandwidth is applicable to various systems or devices (for example but not limited to, the AI system 200 in FIG. 2) that execute artificial neural network models, so as to reduce a utilization bandwidth of memories used in the systems.

In step S410, a data size of a data tile stored in a first memory (for example, the memory 232 in FIG. 2) is determined according to a capacity of the first memory when a convolution operation circuit (for example, the convolution operation circuit 234 in FIG. 2) performs a convolution operation, wherein a memory management circuit (for example, the memory management circuit 231 in FIG. 1) transfers the data tile from a DRAM (for example, the memory 220 in FIG. 2) to the first memory, and the convolution operation circuit acquires the data tile from the first memory and sequentially performs multiple stages of calculations corresponding to the convolution operation on the data tile to generate multiple output feature maps (for example, the multiple output feature maps 330-1 to 330-$n$ in FIG. 3B).

In some embodiments, the step S410 may be used to determine a data size of the data tile to be read to the memory 232. As shown in FIG. 3C, in each stage of the calculations, the data tile of an input feature map (namely an output feature map generated in the previous-stage calculation) and the data tile of an output feature map are stored to the memory 232. As shown in FIG. 3A, the data size of the data tile (for example, the data tile 310[1]) in the input feature map 310 is different from the data size of the data tile (for example, the data tile 320[1]) in the output feature map 320. Under such condition, if the data size of the data tile read to the memory 232 is smaller, in order to capture the intact input feature map 310, the memory 220 (and/or the memory 232) needs to be repeatedly accessed multiple times. As a result, the bandwidth requirement for the memory 220 and/or the memory 232 is increased. Thus, in order to reduce the number of access times above, the data size of the data tile read to the memory 232 is configured to be as large as possible, while complying with the capacity of the memory 232.

More specifically, taking FIG. 3A for example, the capacity of the memory 232 is supposed to be X, a total data amount of the data tile of the input feature map 310 and that of the data tile of the output feature map 320 stored in the memory 232 cannot exceed the capacity X of the memory 232, wherein the capacity X is expressed as an equation (1) below:

$$\text{tile\_}w1 \times \text{tile\_}h1 \times c1 + \text{tile\_}w2 \times \text{tile\_}h2 \times c2 < X \qquad (1);$$

where the width tile_w1 and the height tile_h1 are the data size of the data tile of the input feature map 310, the width tile_w2 and height tile_h2 are the data size of the output feature map 320, c1 is a channel count corresponding to the input feature map 310, and c2 is a channel count corresponding to the output feature map 320.

Moreover, in the mathematical concept of the convolution operation, the width tile_w1 and the height tile_h1 of the data tile of the input feature map 310 and the width tile_w2 and height tile_h2 of the output feature map 320 satisfy an equation (2) and an equation (3) below:

$$(\text{tile\_}w1 - f\_w)/\text{stride\_}w + 1 = \text{tile\_}w2 \qquad (2);$$

$$(\text{tile\_}h1 - f\_h)/\text{stride\_}h + 1 = \text{tile\_}h2 \qquad (3);$$

where f_w and f_h respectively represent a width and a height of the convolution kernel 315, stride_w is a width stepsize each time the convolution kernel 315 moves on the input feature map 310, and stride_h is a height stepsize each time the kernel 315 moves on the input feature map 310.

In addition, since overlapping data exists between the multiple data tiles 310[1] to 310[4] of the input feature map 310, the overlapping data is repeatedly read during the process of the convolution operation. Therefore, for the input feature map 310, the total data amount that needs to be read can be derived from the equation (4) below:

$$(w2/\text{tile\_}w2) \times (h2/\text{tile\_}h2) \times \text{tile\_}h1 \times \text{tile\_}w1 \times c1 \qquad (4)$$

In the equation (2) to the equation (4), the width f_w, the height f_h, the width stepsize stride_w, the height stepsize stride_h, the width w2, the height h2, the channel count c1 and the channel count c2 are constant values in a CNN model, and the capacity X of the memory 232 can be learned in advance. Thus, using the equation (1) to the equation (3), the width tile_w1 and the height tile_h1 (corresponding to the data size of the input feature map 310) and the width tile_w2 and the height tile_h2 (corresponding to the data size of the output feature map 320) that render the equation (4) to have a smallest value can be found while the equation (1) is satisfied. It should be understood that, when the equation (1) is satisfied and the equation (4) is provided with a smallest value, it means that the number of access is minimized while complying with the capacity of the memory 232. As a result, the bandwidth requirement for the memory 220 and/or the memory 232 can be reduced.

Again referring to FIG. 4, in step S420, according to a capacity of a second memory (for example, the memory 233 in FIG. 2) and a first-part data (for example but not limited to, data tiles of a row) of the last output feature map (for example, the output feature map 330-$n$ in FIG. 3B) among the multiple output feature maps, the number of stages of the multiple stages of calculations and a data amount needed for generating at least one second-part data (for example but not limited to, data tiles of one row) of each of the remaining data (for example, the multiple output feature maps 330-1 to 330-($n$−1)) of the multiple output feature maps are determined. During the process of performing the multiple stages of calculations, the memory management circuit stores the first-part data and the at least one second-part data to the second memory.

Figure 5A:
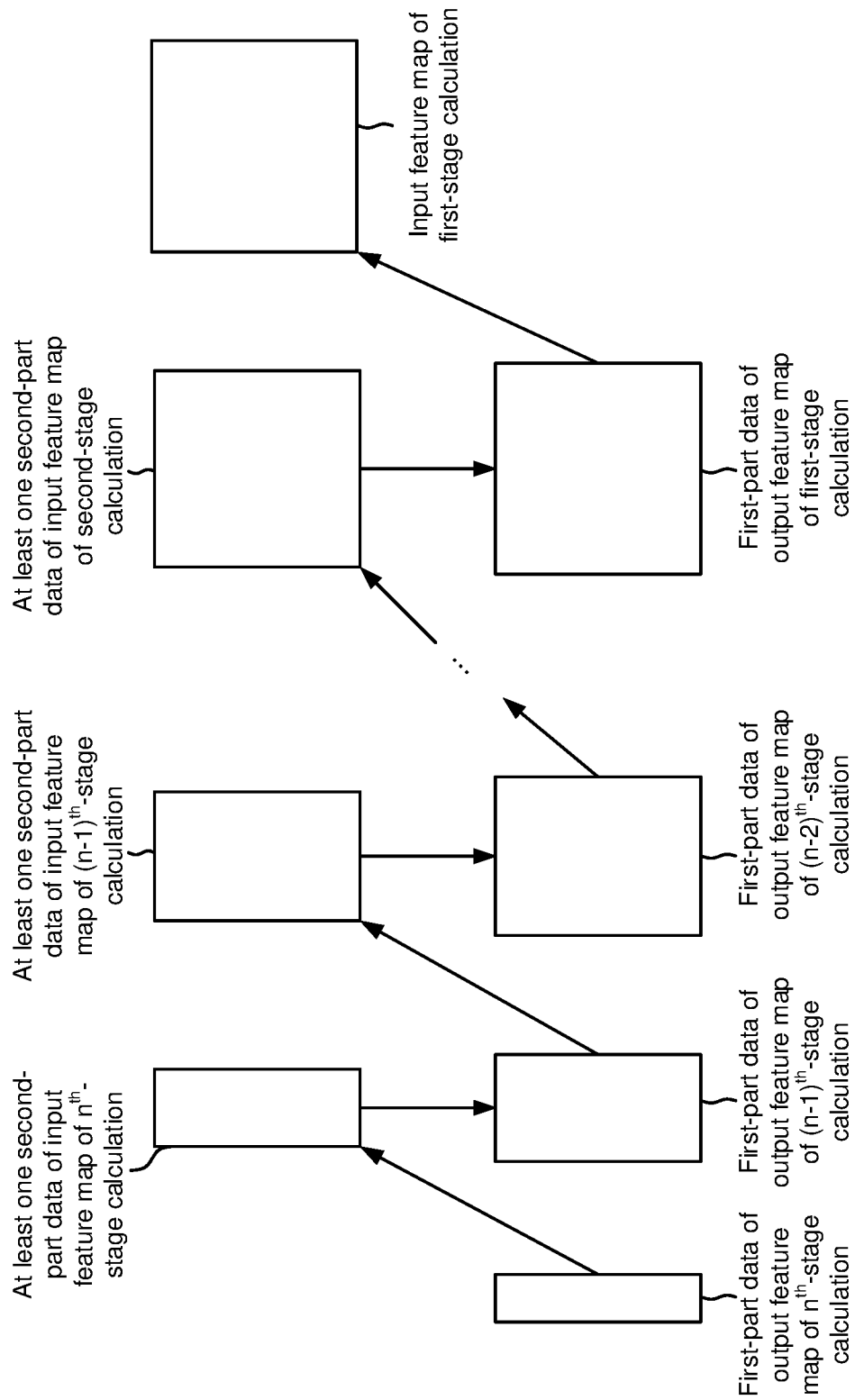
FIG. 5A is a conceptual and schematic diagram of a n operation in FIG. 4 according to some embodiments of the present application.
Figure 5B:
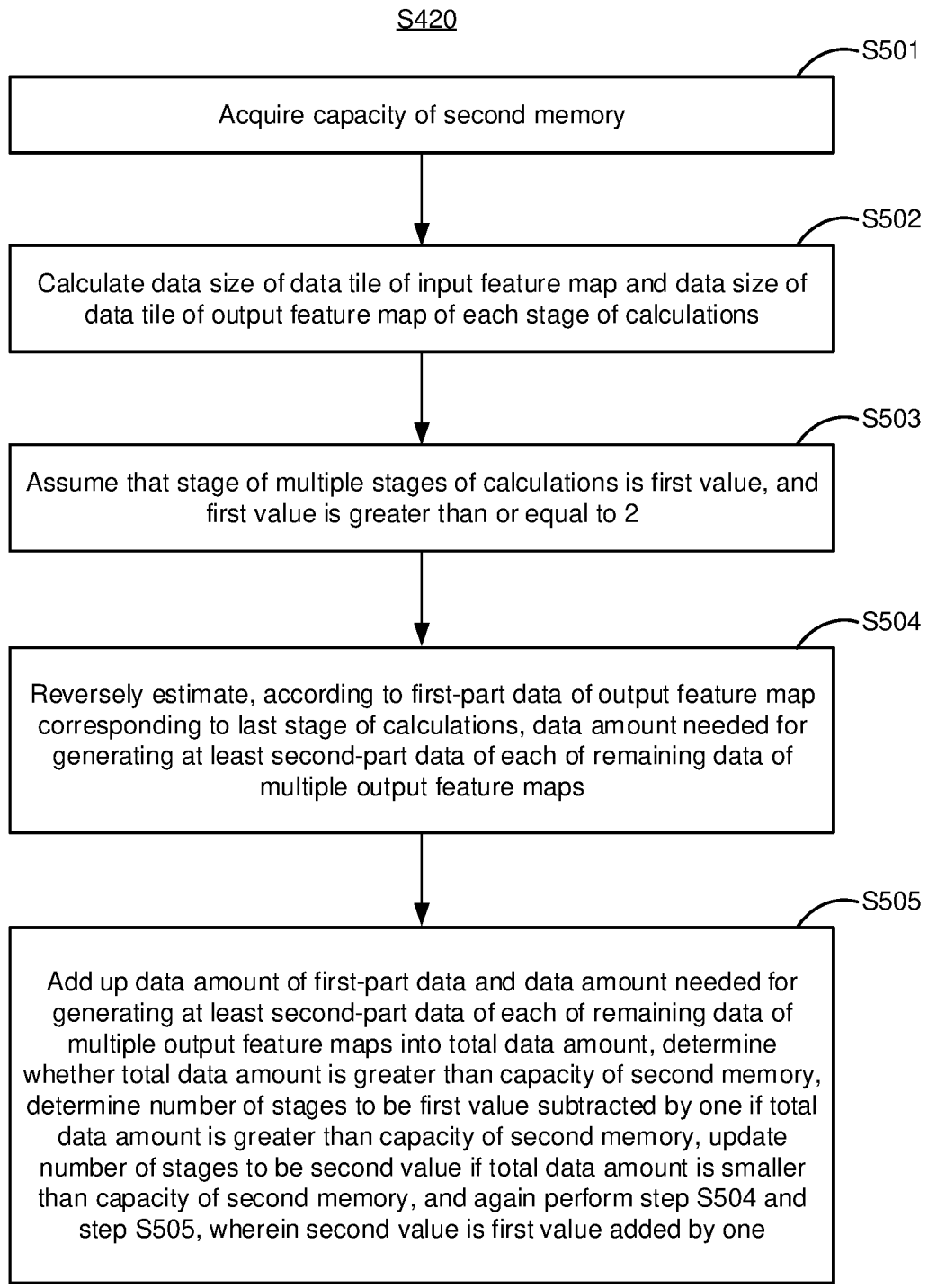
FIG. 5B is a flowchart of detailed sub-steps of an operation in FIG. 4 according to some embodiments of the present application.

Refer to FIG. 5A and FIG. 5B for the description of the step S420. FIG. 5A shows a conceptual and schematic diagram of an operation of the step S420 in FIG. 4 according to some embodiments of the present application. In some embodiments, the step S420 can be configured to improve a hit rate of accessing the memory 232 so as to reduce the number of times of access to the memory 220. As described previously, for each stage operation, the data size of the input feature map is different from the data size of the output feature map. In order to allow the memory 233 to store data tile as much as possible so as to be sufficiently enough, the number of stages of the multiple stages of calculations can be determined by means of reverse estimation.

For example, as shown in FIG. 5A, by using the equation (2) and the equation (3) above, the data size and the needed data amount (equivalent to the above specific predetermined value) of the data tile of the input feature map of the $n^{th}$-stage calculation (equivalent to the output feature map 330-($n$−1) generated by the ($n$−1)$^{th}$-stage calculation) can be estimated according to a first-part data (for example but not limited to, data tiles of one row) of the output feature map 330-$n$ of the last stage (that is, the $nt^h$ stage). Next, by using the equation (2) and the equation (3) above again, the data size and the needed data amount of the data tile of the input feature map of the ($n$−1)$^{th}$-stage calculation (equivalent to the output feature map 330-($n$−2) generated by the ($n$−2)$^{th}$-stage calculation) can be estimated according to at least one second-part data (for example, data tiles of one row) of the output feature map 330-$n$ of the ($n$−1)$^{th}$ stage. The rest of the process may be deduced by analogy, until the data size and the needed data amount (equivalent to the first predetermined value above) of the data tile of the input feature map of the first-stage calculation have been estimated. Next, a data amount of the first-part data and a data amount needed for generating the at least one second-part data in the calculations of the remaining stages are added into a total data amount, and it is determined whether the total data amount exceeds the capacity of the memory 233. If the total data amount does not exceed the capacity of the memory 233, the number of stages is added by one, and the estimation is again performed. Or, if the total data amount exceeds the capacity of the memory 233, the number of stages is set to ($n$−1).

FIG. 5B shows a flowchart of detailed sub steps of the step S420 in FIG. 4 according to some embodiments of the present application. In step S501, a capacity of a second memory (for example, the memory 233) is obtained. In step S502, a data size of data tile of the input feature map and a data size of data tile of the output feature map in each stage of calculations are calculated. For example, as described above, data sizes of data tile of the input feature map and that of the output feature map used in each stage of calculations are calculated by using the equation (2) and the equation (3) above. In step S503, it is assumed that the number of stages of the multiple stages of calculations is a first value (for example, a value n), and the first value is greater than or equal to 2. In step S504, according to a first-part data (for example but not limited to, data tiles of one row) of the output feature map of the last stage of calculations, a data amount needed for generating at least one second-part data of each of the remaining data of the multiple output feature maps is reversely estimated. In step S505, a data amount of the first-part data and the data amount needed for generating the at least one second-part data of each of the remaining data of the multiple output feature map are added into a total data amount, it is determined whether the total data amount is greater than the capacity of the second memory, the number of stages is determined to be the first value subtracted by one while the total data amount is greater than the capacity of the second memory, the number of stages is updated to a second value while the total data amount is smaller than the capacity of the second memory, and step S504 and step S505 are repeated, wherein the second value is the first value added by one.

With multiple of the steps S501 to S505, the convolution operation of one layer of the CNN model can be split into multiple calculations. Thus, on the basis of the same concept, by performing the step S420 multiple times, the convolution operations of multiple layers of the CNN model can be further split into multiple stages of calculations.

Again referring to FIG. 4, in step S430, a precompiled file is configured to record the data size of the data tile, the number of stages of the multiple stages of calculations, the data amount of the first-part data and the data amount of the at least one second-part data, wherein the memory management circuit accesses the DRAM, the first memory and the second memory based on the precompiled file.

As described above, with the step S420, the convolution operation of each layer (corresponding to different commands) of the CNN model can be split into multiple stages of calculations. Thus, the correspondence between various types of information (for example, the number of stages of the multiple stages of calculations, and the data sizes and the needed data amounts of data tile of the input feature map and the output feature map used in the multiple stages of calculations) obtained by the step S410 and the step S420 and multiple commands is recorded as the precompiled file. As such, the processor 210 in FIG. 2 can generate a command CMD according to the precompiled file, and the memory management circuit 231 can determine how to split the convolution operation corresponding to the command CMD based on the command CMD and accordingly access the memory 220, the memory 232 and the memory 233.

In some embodiments, the method 400 for reducing a memory bandwidth can be performed by a computer-aided design (CAD) system and/or computer simulation software to generate the precompiled file, and the precompiled file can be prestored in a buffer (not shown) of the AI system 200. Thus, the processor 210 can generate the command CMD according to the precompiled file. In some other embodiments, the method 400 for reducing a memory bandwidth can also be performed by the processor 210. It should be noted that the application details of the above method 400 for reducing a memory bandwidth are merely examples, and are not to be construed as limitation to the present application.

The multiple operations and/or steps in FIG. 4 and FIG. 5B are merely examples, and are not limited to being performed in the order specified in the examples. Without departing from the operation means and ranges of the various embodiments of the present application, additions, replacements, substitutions or omissions may be made to the operations, or the operations may be performed in different orders (for example, simultaneously performed or partially simultaneously performed).

In conclusion, the intelligent processing device and the method for reducing a memory bandwidth according to some embodiments of the present application are capable of splitting convolution operations of multiple layers of a CNN model into multiple stages of calculations, and temporarily storing operation results generated during the multiple stages of calculations to an additional cache. As a result, the number of access times and data access amount of an original memory of the system can be reduced, so as to reduce a bandwidth requirement of the memory.

While the present application has been described by way of example and in terms of the preferred embodiments, it is to be understood that the present application is not limited thereto. Various modifications made be made to the technical features of the present application by a person skilled in the art on the basis of the explicit or implicitly disclosures of the present application. The scope of the appended claims of the present application therefore should be accorded with the broadest interpretation so as to encompass all such modifications.

What is claimed is:

1. An processing device, comprising:
a first memory;
a memory management circuit, configured for reading an input data from a dynamic random access memory (DRAM), and storing the input data to the first memory;
a second memory; and
a convolution operation circuit configured for (i) reading the input data from the first memory, and (ii) performing a plurality of stages of calculations corresponding to a convolution operation to generate a plurality of output feature maps,
wherein after the convolution operation circuit performs a first-stage a calculation among the plurality of stages of calculations to generate at least one first data tile of a first output feature map among the plurality of output feature maps, the memory management circuit stores the at least one first data tile to the second memory; and
when a data amount of the at least one first data tile stored in the second memory satisfies a predetermined value, the memory management circuit transfers the at least one first data tile from the second memory to the first memory, and the convolution operation circuit reads the at least one first data tile from the first memory and accordingly performs a second stage calculation among the plurality of stages of calculations on the at least one first data tile to generate at least one second data tile of a second output feature map among the plurality of output feature maps, and stores the at least one second data tile to the second memory through the memory management circuit.

2. The processing device according to claim 1, wherein the first memory is a level-2 (L2) cache, and the second memory is a level-3 (L3) cache.

3. The processing device according to claim 1, wherein a data width of the first memory is equal to a data width of the convolution operation circuit, and a data width of the second memory is different from the data width of the convolution operation circuit.

4. The processing device according to claim 1, wherein the first memory is directly connected to the convolution operation circuit, and the second memory is coupled to the convolution operation circuit through the memory management circuit.

5. The processing device according to claim 1, wherein after the convolution operation circuit generates a last output feature map among the plurality of output feature maps, the memory management circuit transfers the last output feature map from the second memory to the DRAM.

6. The processing device according to claim 1, wherein the predetermined value is a data amount that is sufficient for the convolution operation circuit to generate the at least one second data tile.

* * * * *